United States Patent [19]
Saitoh et al.

[11] Patent Number: 5,309,557
[45] Date of Patent: May 3, 1994

[54] IMAGE FORMING METHOD AND APPARATUS INCLUDING MEANS FOR DETERMINING PROCESSING TIME

[75] Inventors: Takashi Saitoh, Tokyo; Yasufumi Tanimoto, Fujisawa, both of Japan

[73] Assignee: Kabushiki Kaisha Toshiba, Kawasaki, Japan

[21] Appl. No.: 605,390

[22] Filed: Oct. 30, 1990

[30] Foreign Application Priority Data

Oct. 31, 1989 [JP] Japan .................................. 1-283742

[51] Int. Cl.⁵ .............................................. G06F 15/20
[52] U.S. Cl. ....................................... 395/162; 395/375; 395/550
[58] Field of Search ............... 395/162, 164, 100, 101, 395/107, 116, 117, 113, 375, 550; 364/221.7, 221.9, 271

[56] References Cited

U.S. PATENT DOCUMENTS

| | | | |
|---|---|---|---|
| 4,511,243 | 4/1985 | Smith | 355/209 |
| 4,991,972 | 2/1991 | Ikenoue et al. | 395/113 |
| 5,157,518 | 10/1992 | Ohtaki et al. | 358/461 |

Primary Examiner—Dale M. Shaw
Assistant Examiner—Kee M. Tung
Attorney, Agent, or Firm—Foley & Lardner

[57] ABSTRACT

A processing time necessary for processing an image processing command to be processed is calculated and displayed. The processing time is successively subtracted as the processing proceeds, and the processing time required for the remain is displayed. This permits the operator easy grasp of the progress of processing, and therefore the operation efficiency can be increased.

8 Claims, 8 Drawing Sheets

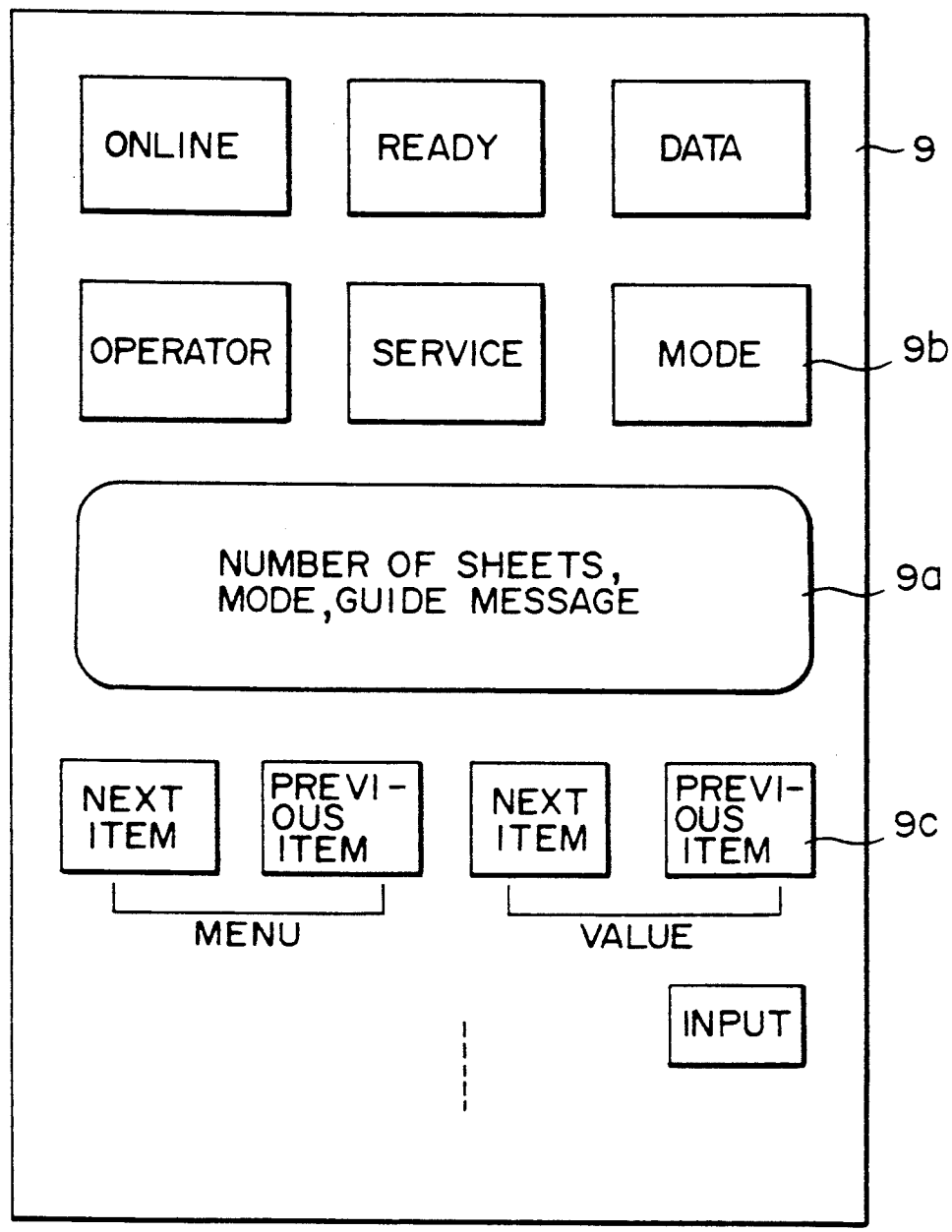
F I G. 2

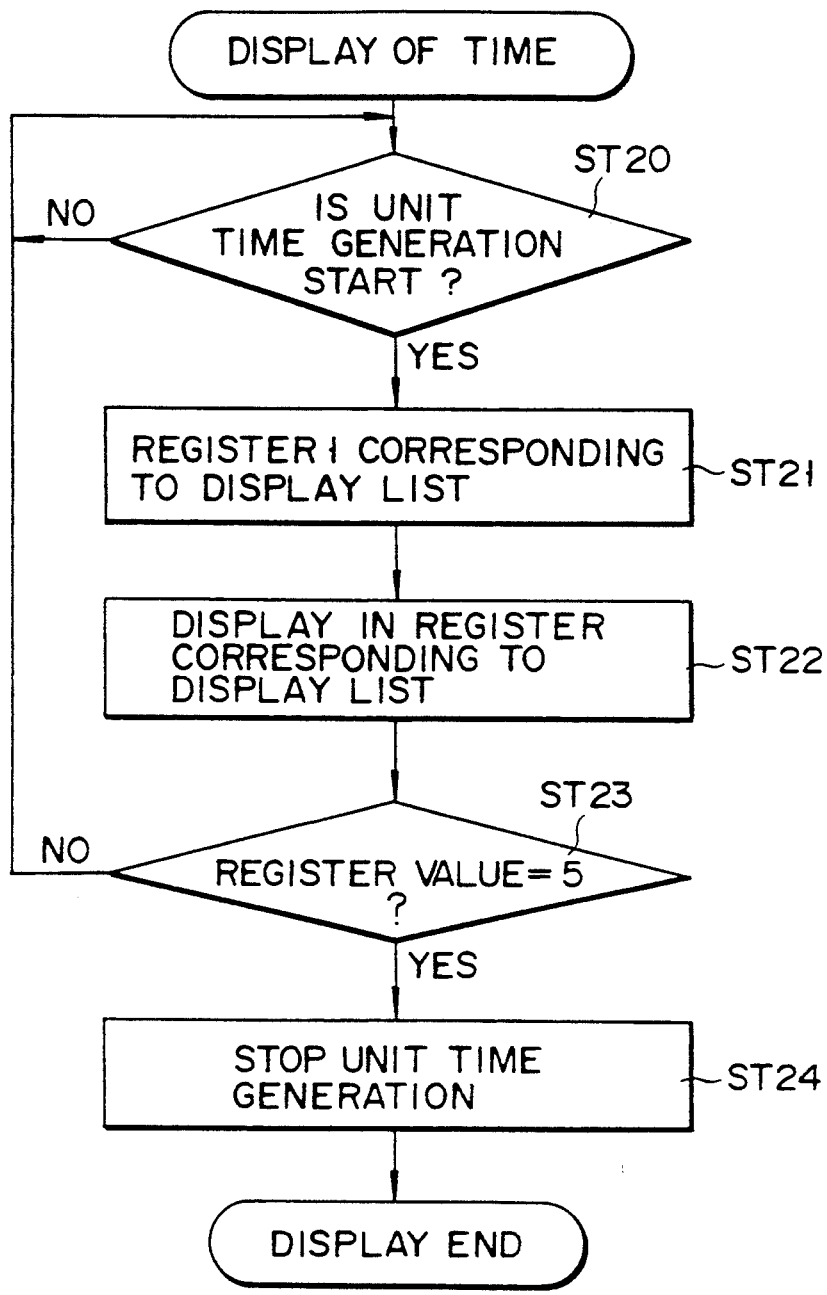
F I G. 6C
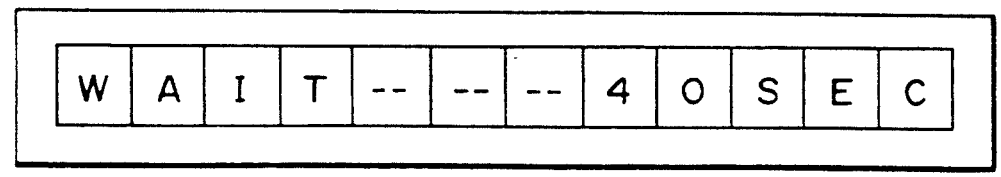
F I G. 7

IMAGE FORMING METHOD AND APPARATUS INCLUDING MEANS FOR DETERMINING PROCESSING TIME

BACKGROUND OF THE INVENTION

1. Field of the Invention

This invention relates to a method of forming an image, for example, executing the print out and plot out of an image, and an apparatus for embodying the same, and particularly to a data processing method of developing images by bit imaging and an apparatus for embodying the same.

2. Description of the Related Art

The conventional image forming apparatus of one line print data transfer type, receiving from the host unit an image processing command, such as page description language (PDL: image forming software by addressing) command and plot command, develops and forms an image according to command with necessary minimum information. With such an conventional image forming apparatus, however, it is entirely impossible for the host unit to forecast how much it takes to obtain printing output after sending the command. Thus, there was a drawback that operation efficiency of the operator is poor.

SUMMARY OF THE INVENTION

It is an object of the present invention to provide a method of forming image to facilitate the operator to grasp the progress of an operation, and an apparatus for embodying the same.

In order to attain the above object, there is provided a data processing method according to the present invention, comprising the steps of:

storing a plurality of processing time data corresponding to a plurality of processing commands to a first memory, respectively;
receiving at least one of the processing commands;
reading the processing time data corresponding to the received processing command from the first memory;
storing the processing time data read from the first memory to a second memory;
processing data in accordance with the received processing command;
providing a prescribed time data in response to the start of the operation;
computing the remaining time of the operation from the processing time data stored in the second memory means with the prescribed time data; and
displaying the computed remaining time.

In order to attain the above object, there is provided a data processing apparatus according to the present invention, comprising:

first memory means for storing a plurality of processing time data corresponding to a plurality of processing commands, respectively;
means for receiving at least one of the processing commands;
means for reading the processing time data corresponding to the processing command received by the receiving means from the first memory means;
second memory means for storing the processing time data read by the reading means;
means for processing data in accordance with the processing command received by the receiving means;
means for providing a prescribed time data in response to the start of the data processing operation by the processing means;
means for computing the remaining time for the data processing operation by the processing means from the processing time data stored in the second memory means with the prescribed time data provided from the providing means;
means for displaying the remaining time computed by the computing means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 2 is a plan view showing an arrangement of an operation panel 9 shown in FIG. 1;

FIG. 6C is a flow chart for explaining subtracting procedures of processing time in a register during processing in FIG. 5; and FIG. 7 is an illustration exemplifying the command processing time.

DETAILED DESCRIPTION OF THE PREFERRED EMBODIMENTS

An embodiment of the image forming apparatus according to the present invention will be described hereinafter with reference to the accompanying drawings.

Figure 1:
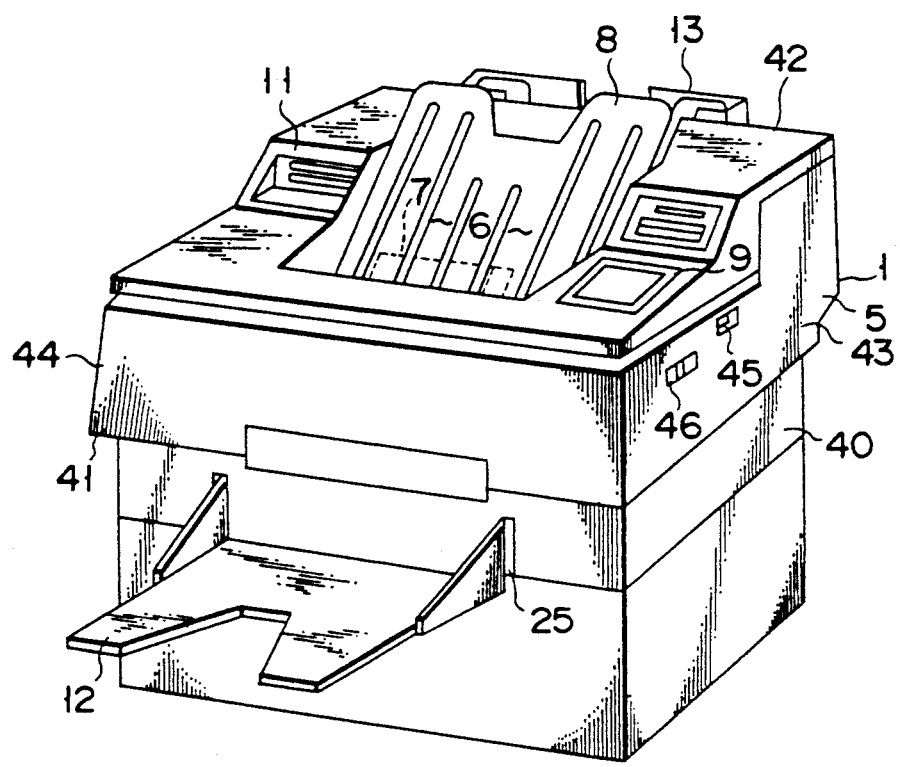
FIG. 1 is a perspective view showing an outer appearance of an image forming apparatus according to the present invention.

FIG. 1 is a perspective view showing an outer appearance of the image forming apparatus according to the present invention. The image forming apparatus comprises a laser printer apparatus. The rear top section of the printer body 5 of the image forming apparatus 1 is one step higher, and a paper discharging portion 6 is formed on the top center of the apparatus 1. On the paper discharging portion 6, a paper discharging tray 8 is mounted to be movably supported by a jogger 7. An operation panel 9 is set on the right side of the paper discharging portion 6, and three IC card inserting ports 11 are provided on the left side of the apparatus 1. A paper discharging tray 12 is provided in front of the printer body 5 and a manual feeding tray 13 is set on the back surface side of the apparatus 1. The outer surfaces of the image forming apparatus is covered with a lower cover 40, a front cover 41, an upper cover 42, a right door cover 43 which can be freely opened and closed, and a left door cover 44. A right cover opening/closing lever 45 and an upper unit opening/closing lever 46 are provided on the right side surface of the apparatus 1. A reference numeral 25 denotes a paper feed cassette.

FIG. 2 is a plan view showing an arrangement of an operation panel 9 shown in FIG. 1. The operation panel 9 comprises an LCD (liquid crystal) display (display means) 9a for displaying the number of sheets, mode, guide message and the like, an LED (light emitting diode) display 9b for displaying various conditions, and a switch 9c for indicating various operations. The LED display 9b comprises an ON LINE display for showing whether the printer is connected to the external equipments or not, a READY display for showing that the printer is in the condition ready for operation, a DATA display for showing image data is being transferred an OPERATOR display for requesting operator call, a SERVICE display for requesting service man call, and a MODE display for showing auto/manual mode.

The switch 9c comprises, for example, a menu key, a value key, an input key, and a ten key (not shown). The menu key comprises two keys of NEXT ITEM and PREVIOUS ITEM, and two or more menu items displayed on the left half of the LCD display 9a are incremented every time the NEXT ITEM key is pressed, and are decremented every time the PREVIOUS ITEM key is pressed. These operations are repeated cyclically. Value information are also incremented every time the NEXT ITEM key is pressed and are decremented every time the PREVIOUS ITEM key is pressed, and these operations are repeated cyclically. The operator can select desired operation by operating the menu key or value key, and can instruct a specified operation by pressing the input key. Further, by pressing the ten key (not shown), it is possible to input the value information. This can be used for setting the number of copying sheets, for example.

Figure 3:
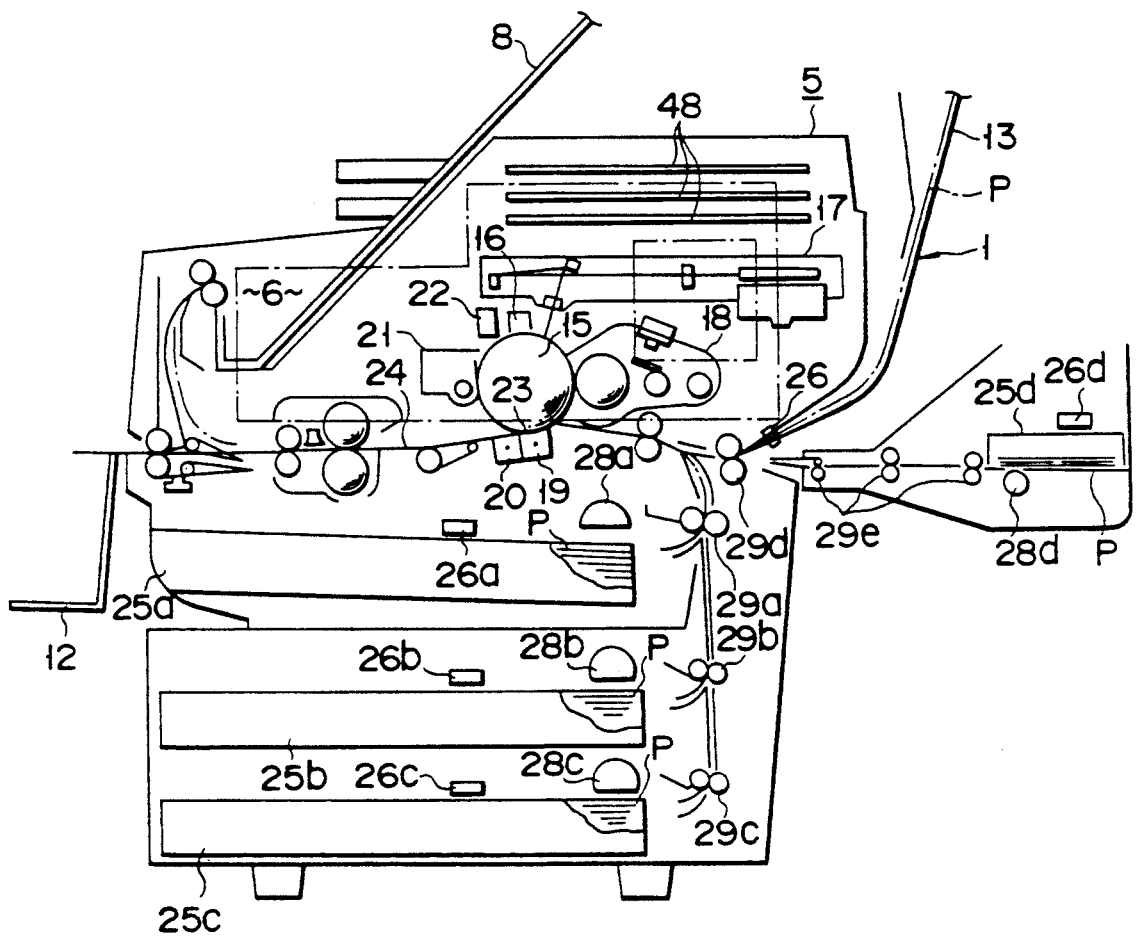
FIG. 3 is a sectional side view showing an arrangement of the image forming apparatus shown in FIG. 1.

FIG. 3 is a sectional side view showing an arrangement of image forming apparatus shown in FIG. 1. The image carrier, i.e., photosensitive body 15 of the drum type is provided nearly in the center of the printer body 5. Around the photosensitive body 15 are successively arranged a charger 16, a laser optical system 17, a developer 18, a transfer charger 19, a separating charger 20, a cleaner 21, and a discharger 22. A paper sensor 26 is provided in the bottom of the manual feeding tray 13. The sensor 26 detects the paper P, i.e., the image forming medium, inserted into the manual feeding tray 13 and informs the CPU 50, described later.

In the printer body 5, an image carrier carrying path 24 is formed extending forward through the image transferring portion 23 formed between the photo-sensitive body 15 and the transfer charger 19. Papers P which are automatically fed from the paper feed cassettes 25a, 25b, and 25c which are accommodated in the bottom portion of the printer body 5, through the paper feed rollers 28a, 28b, and 28c and the transferring roller pairs 29a, 29b, and 29c, or papers P which are manually fed from the manual feeding tray 13 through the transfering roller pair 29d, or further papers P which are automatically fed from the paper feed cassette 25d provided in the rear portion of the image forming apparatus 1 through the paper feeding roller 28d and the transferring roller pairs 29e and 29d, are guided to the above image transferring portion 23 along the carrying path 24. The paper sensors 26a, 26b, 26c, and 26d which detect the paper P by the light reflected therefrom are provided above the paper feed cassettes 25a, 25b, 25c, and 25d respectively, and they send a signal to the CPU 50 when the paper P runs short.

Figure 4:
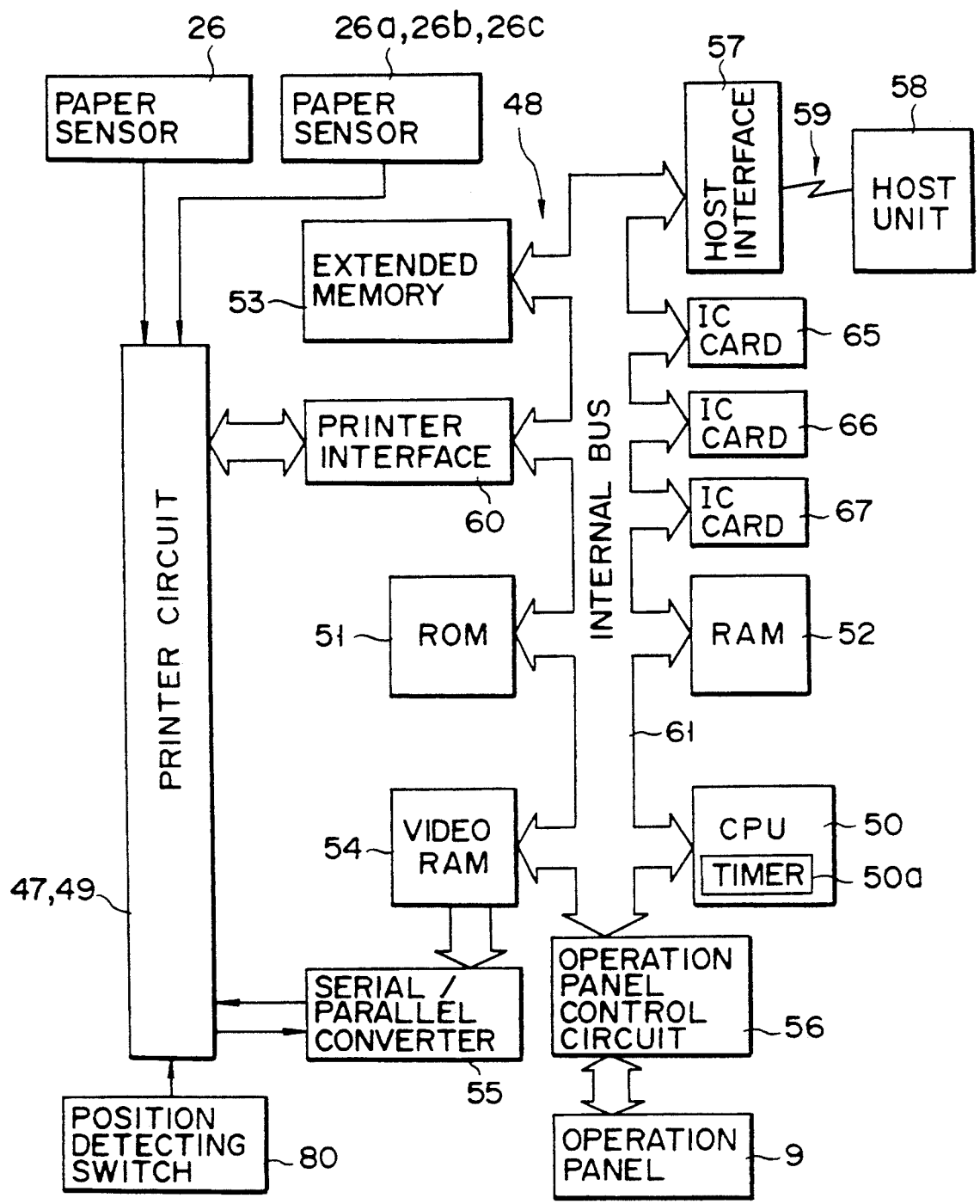
FIG. 4 is a block diagram showing a main part of an electric circuit of a printer control portion 48 shown in FIG. 3.

FIG. 4 is a block diagram showing a main part of an electric circuit of a printer control portion 48 shown in FIG. 3. The CPU (receiving means) 50 controls the whole image forming apparatus 1. In the CPU 50, display lists are configured as a command (image processing command for specifying optional image formation) train in a page unit. A unit time generating means 50a can be a software timer, and the unit time is one second in this embodiment, for example. A ROM 51 (first storage means) stores a control program, and the CPU 50 operates according to this control program. Data relating to the paper P, such as encryption number (ID number) identified when data are changed, top margin, left margin, and paper type are stored in the ROM 51. Processing time data, each obtained by partitioning the average processing time for each command into the second unit, are stored in advance in the ROM 51. A RAM (adding and subtracting means) 52 can be used as a page buffer which temporarily stores the image data sent from the host unit 58 and as a working buffer of the CPU 50. The RAM 52 is a 16-bit memory for addition/subtraction of data processing time and is provided for every display list. Processing time for about 18 hours can therefore be stored in the RAM 52, i.e., addition/subtraction memory.

The extended memory 53 is a large capacity memory used when the quantity of image data such as bit map data sent from the host unit 58 is too large to store, one page data in the RAM 52. The video RAM 54 is used as a scan buffer in which the image data developed on the bit image are stored. The video RAM 54 is a memory which develops the command on the bit image, and outputs the image data as parallel data in the print output size. The serial-parallel converter circuit 55 converts the image data sent in the form of parallel data into serial data, and sends the data to the printer circuits 47 and 49.

The host interface 57 transmits and receives data, for example, between a computer or the host unit 58 such as image reading device and a printer control portion 48. The transfer line 59 connecting these units is provided with transfer serial and parallel lines. The transfer line 59 can be properly used depending upon the types of data transferred between the host unit 58 and the host interface 57. The host interface 57 has a plurality of input and output ports (not shown) and can connect two or more host units 58. This permits the image forming apparatus 1 to be accessed by two or more host units 58 in a time sharing manner, and to form images in various sizes.

The printer interface 60 intermediates the delivery of control signal lines between the printer control portion 48 and the printer circuits 47 and 49. The detecting signals from the above mentioned paper sensor 26, paper sensors 26a, 26b, 26c or position detecting switch 80 are also sent to the CPU 50 through the printer interface 60.

The operation panel control circuit 56 controls the display of the guide messages on the LCD display 9a of the operation panel 9, controls the lighting and the flashing of the LED display 9b, and controls the outputting of the data input from the switch 9c to the CPU 50. The internal bus 61 delivers information between CPU 50, ROM 51, RAM 52, extended memory 53, video RAM 54, operation panel control unit 56, host interface 57, printer interface 60, and IC cards 65 to 67 each other.

The IC cards 65 to 67 comprise a nonvolatile memory such as static RAM, E$^2$PROM, EPROM, or mask ROM with a battery backup. These IC cards 65 to 67 are used as the extended memories of the unit, or as the loading mediums for program or other data. The IC cards are classified by colors, depending on the type of memory and the function of the contents stored therein. For example, IC card of the mask ROM type with a font stored is colored blue, and IC card of static RAM type with emulation recorded is colored orange. Therefore, IC cards 65 to 67 can be seen at a glance to be of the stored type and to contain written data.

The operation of the image forming apparatus according to the present invention will be described with reference to FIGS. 5, 6A, 6B and 6C.

Figure 5:
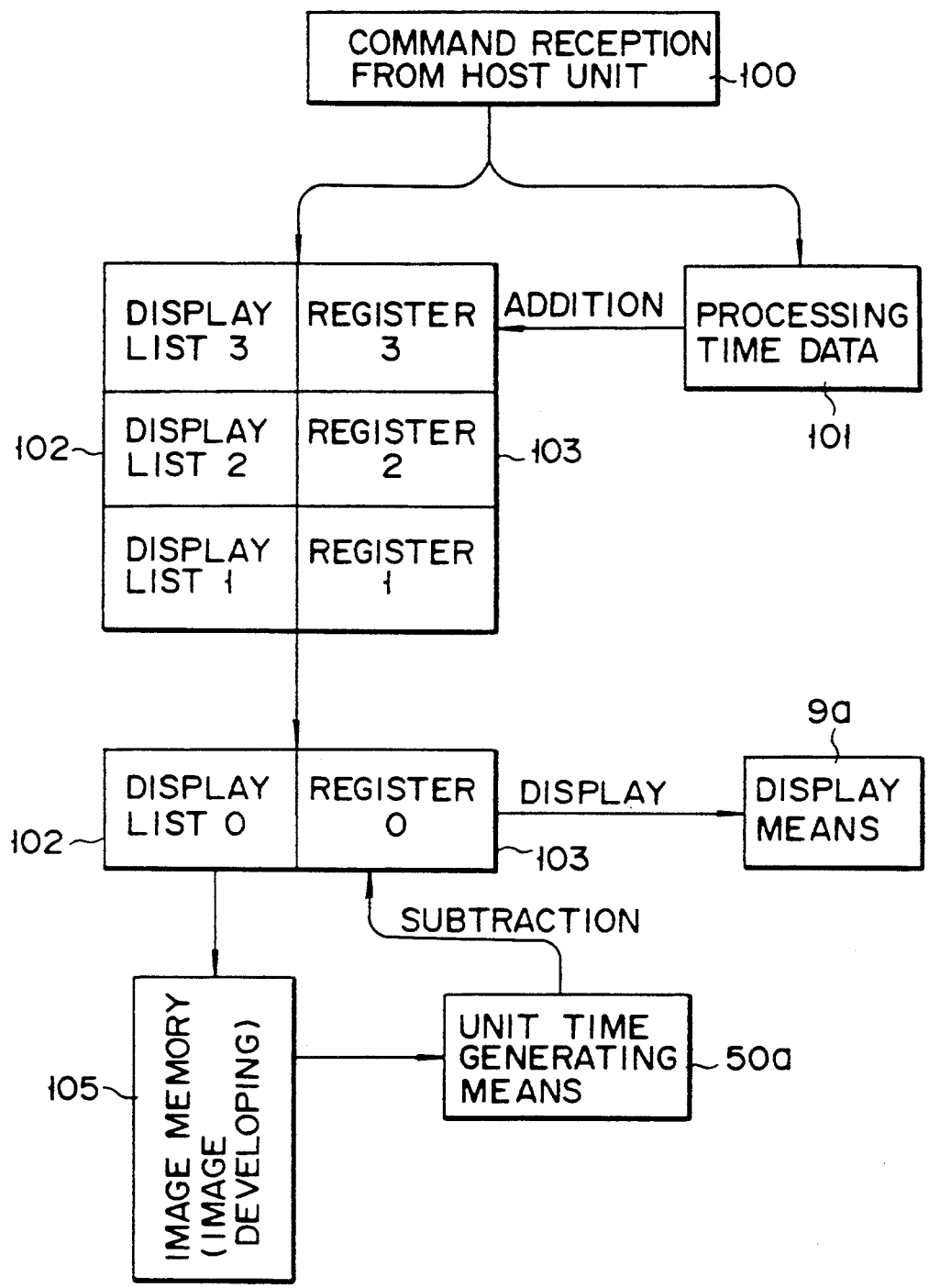
FIG. 5 is an illustration showing the connection of data processing according to the present invention.

FIG. 5 is an illustration showing the connections for data processing according to the present invention. The command 100 received from the host unit 58 is sent to the CPU 50 and the ROM 51 (also to the RAM 52, as required). The processing time data necessary for each command is drawn out of the ROM 51 and is sent to the RAM 52 in turn. The CPU 50 constructs display lists in page unit in response to the received commands. The processing time for every command constituting each display list is added in the RAM 52, and stored as processing time required for the register (second storage means) corresponding to each display list in the CPU 50. That is, the processing time required for every page is stored in each corresponding register. The received commands are successively stacked in the display lists 0, 1, 2, - - - in the CPU 50 and the processing times required are successively stacked in the corresponding register 0, 1, 2, - - - . The display list is send to the image memory 105 in the stacked order under the control of the CPU 50, and is developed and processed therein. The necessary processing time of the register 0 corresponding to the display list 0 during processing is displayed as a guide message on the display means 9a, that is, the LCD display 9a. The image memory (processing means) 105 makes the unit time generating means 50a generate unit time at the same time as the start of processing, and the generating means 50a subtracts unit time from the required processing time in the register 0 sequentially as the processing proceeds. Thus, until the processing of the display list is completed, the processing time is subtracted along the progress of the processing and is displayed successively.

Figure 6A:
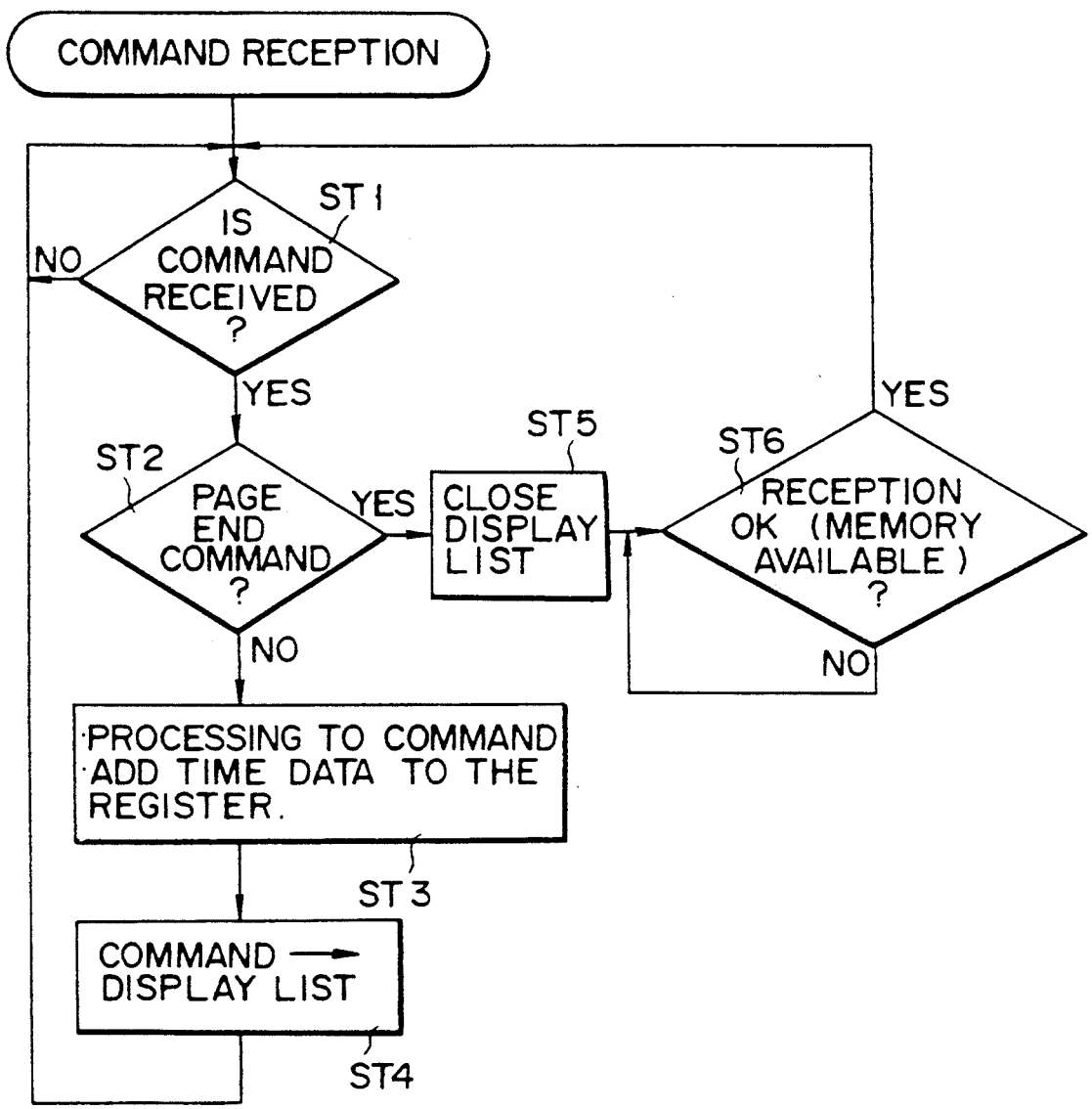
FIG. 6A is a flow chart for explaining setting procedures of the command received in FIG. 5.

FIG. 6A is a flow chart for explaining setting procedures of the commands received from the host unit 58. The CPU 50 decides whether a command has been received or not (ST1), and waits for the command if not yet received. When a command is received, it is determined whether the command is a page end command or not (ST2). If the command is a page end command, the display lists in the CPU 50 are closed (ST5). If the memories in the image memory 105 are remaining and the next display list is ready, the CPU 50 assumes the reception standby mode (ST6). On the other hand, if the received command is an image processing command for instructing image formation, the processing time data corresponding to the command is drawn out of the ROM 51 and is added to the preceding processing time. The added processing time data are inputted into the corresponding register every page (ST3). The received commands are also configured into the display lists in the page unit and are successively stacked in the CPU 50 (ST4). Thus, the setting procedures of the received commands are completed.

Figure 6B:
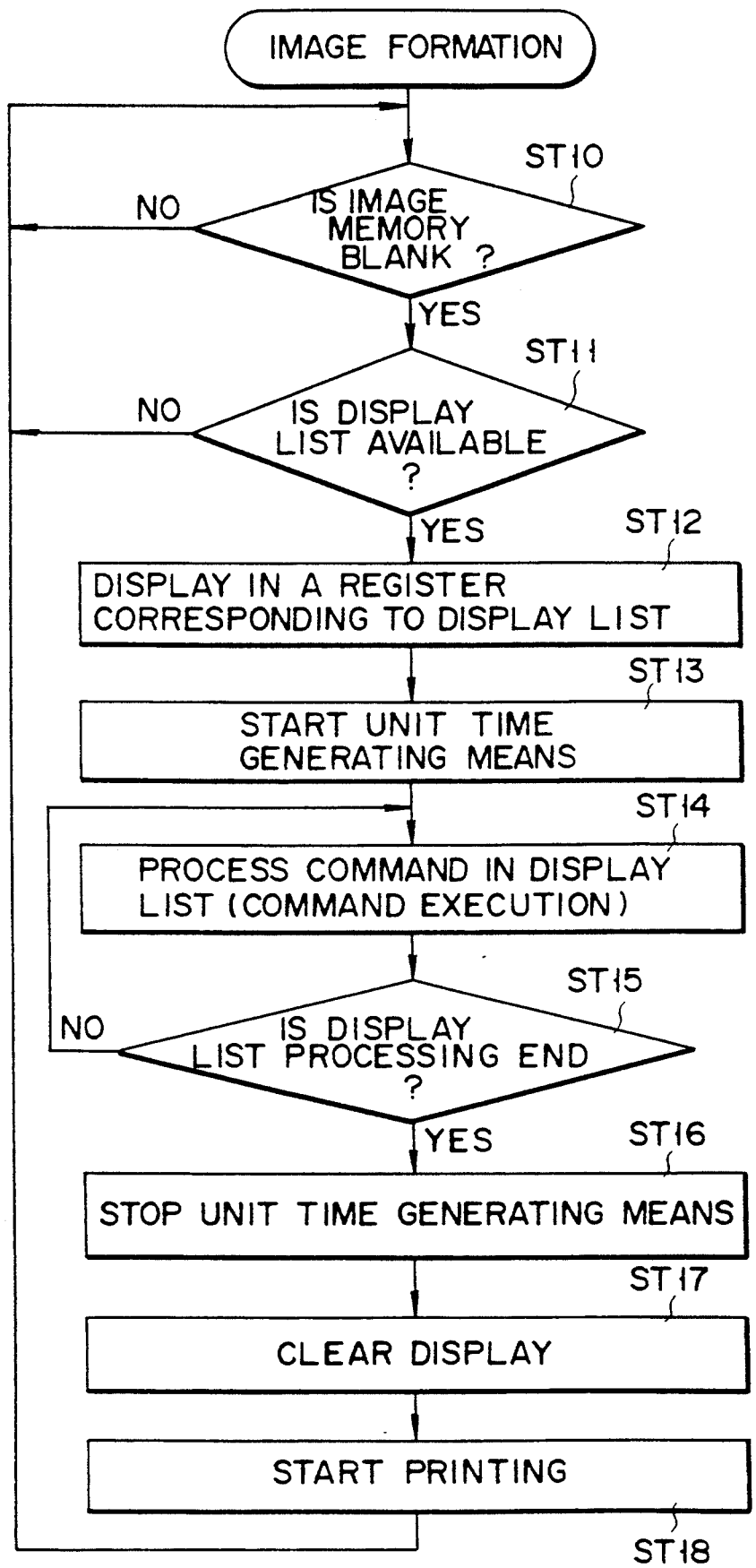
FIG. 6B is a flow chart for explaining image forming procedures in FIG. 5.

FIG. 6B is a flow chart for explaining image forming procedures in FIG. 5. First, the CPU 50 decides whether a memory space of more than one page of the display list is available in the image memory 105 (ST10). If not available, the CPU 50 waits until available. If the memory space in the image memory 105 is available, the CPU 50 decides whether an image forming command is ready in the display list 0 (ST11). If no image forming command is ready, the CPU 50 enters standby mode. If the image forming command is ready, the display means 9a is made to display the processing time data in the register attached to the display list to be processed (ST12). In FIG. 7, a case in which the necessary processing time is 40 sec is exemplified. At the same time as the start of processing the command stacked in the display list in the order of reception (ST14), the unit time generating means 50a is started to generate unit time (ST13). The command is executed until the processing of the display list is completed (ST15). In the image memory 105, the command is developed to the bit image in the print output size. The bit image is outputted as image data to the video RAM 54 and also to the extended memory 53, as required. When the processings of the display list 0 are all completed, the unit time generating means 50a is stopped (ST16), and the display of the processing time on the display means 9a is cleared (ST17). Parallel image data are outputted from the video RAM 54 to the printer circuits 47 and 49 through the serial-parallel converter circuit 55, and the printing is started (ST18). The image memory 105 is cleared together with the display list when the printing results are discharged correctly without trouble such as jam, and the memory 105 becomes ready for the processing of the next display list. Though not shown, the processing is the same as the above mentioned addition/subtraction processing, in the case where the image memory is accessed twice to increase the image developing rate, but the output is sent to the display means 9a after both image memories have been cleared. That is the display is performed after the printing results have been correctly discharged.

FIG. 6C is a flow chart for explaining subtracting procedures of the processing time in the register under processing in FIG. 5. This subtraction is performed in parallel with the steps ST13 to ST16 in FIG. 6B. First, it is decided whether the generation of unit time is started or not (ST20). If not to be started, the unit time generating means 50a stands by. If to be started, unit time is generated. The processing time in the register 0 corresponding to the display list 0 under processing is subtracted by unit time 1 (ST21), and the result is displayed on the display means 9a (ST22). Since the mean value with respect to processing time of the command has been previously stored, actual processing time varies, depending upon the parameter of the command. When the processing is fast, there is no problem, since the display has been cleared when the processing of the display list is completed. When the processing is slow, however, the printing output may fail to come out since the command actually being processed has been completed on the display. To prevent this drawback, if the content of the register exceeds the unit times 5 (for example, 5 sec), further subtraction is stopped. Then, it is decided whether the displayed processing time of the register 0 is 5 in the step ST23. If the value of the register 0 is 5, the generation of unit time is stopped (ST24).

Thus, since the image forming apparatus of such configuration displays the waiting time for image forming which could not have been known so far, the operator can know when the printing output can be obtained, and operating efficiency can be increased.

The printer unit has generally two or more emulators, but in this embodiment, they were made effective only when the plotter and PDL emulator are specified by the command from the operation panel 9 and the host unit 58.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A data processing method adapted for a data processing apparatus, comprising the steps of:
   receiving image data and a processing command, the image data defining the image to be formed on an image forming medium and the processing command defining the processing of image formation of the image data;
   processing the image data corresponding to the processing command to obtain processed image data, the processed image data having processing time data indicating a total amount of time required for processing of the processed image data;
   storing the processing time data corresponding to the processing command in storing means;
   reading the processing time data corresponding to the processing command from the storing means;
   generating prescribed time data indicating a lapse of time while the processing proceeds;
   computing a remaining amount of time required for successive processing operation by comparing the prescribed time data with the processing time data; and
   displaying the remaining amount of time.

2. A data processing apparatus comprising:
   means for receiving image data and a processing command, the image data defining the image to be formed on an image forming medium and the processing command defining processing of image formation of the image data;
   means for processing the image data corresponding to the processing command to obtain processed image data, the processed image data having processing time data indicating a total amount of time required for processing of the processed image data;
   means for storing the processing time data corresponding to the processing command;
   means for reading the processing time data corresponding to the processing command from the storing means;
   means for generating prescribed time data indicating a lapse of time while the processing by the processing means proceeds;
   means for computing a remaining amount of time required for successive processing operation by comparing the prescribed time data with the processing time data; and
   means for displaying the remaining amount of time computed by the computing means.

3. A method for forming an image on an image forming medium, comprising the steps of:
   receiving image data and a processing command, the image data defining the image to be formed on the image forming medium and the processing command defining the processing of image formation from the image data;
   processing the image data corresponding to the processing command to obtain processed image data, the processed image data containing processing time data indicating a total amount of time required for processing the processed image data;
   forming the image on the image forming medium in accordance with the processed image data after completing the processing of the image data;
   storing the processing time data corresponding to the processing command in storing means;
   reading the processing time data corresponding to the processing command from the storing means;
   generating prescribed time data indicating a lapse of time while processing proceeds;
   computing a remaining amount of time required for successive processing by comparing the prescribed time data with the processing time data; and
   displaying the remaining amount of time.

4. A data processing method as claimed in claim 3, wherein the received processing command comprises display lists in a prescribed unit, and data processing time corresponding to each display list is stored in the prescribed unit in a memory.

5. A data processing method as claimed in claim 3, wherein said computing is stopped and the display is also stopped when the remaining time of the processing in a memory becomes shorter than a predetermined time.

6. An apparatus for forming an image on an image forming medium comprising:
   means for receiving image data and a processing command, the image data defining the image to be formed on the image forming medium and the processing command defining the processing of image formation of the image data;
   means for processing the image data corresponding to the processing command to obtain processed image data, the processed image data having processing time data indicating a total amount of time required for processing the processed image data;
   means for forming the image on the image forming medium in accordance with the processed image data after completing the processing of the image data by the processing means;
   means for storing the processing time data corresponding to the processing command;
   means for reading the processing time data corresponding to the processing command from the storing means;
   means for generating prescribed time data indicating a lapse of time while the processing by the processing means proceeds;
   means for computing a remaining amount of time required for the successive processing operation by comparing the prescribed time data with the processing time data; and means for displaying the remaining amount of time computed by the computing means.

7. A data processing apparatus according to claim 6, further including means for constructing a display list in a prescribed unit by said processing command received, and means for storing said processing time data in a prescribed unit in a memory means correspondingly to each display list.

8. A data processing apparatus according to claim 6, further including means for stopping said computing means and said display means when said processing time remaining in a memory means becomes shorter than a predetermined time.

* * * * *